United States Patent [19]
McEwen

[11] Patent Number: 5,985,145
[45] Date of Patent: Nov. 16, 1999

[54] SHAFT MOUNTED GEAR BOX

[75] Inventor: Stephen N. McEwen, Bowling Green, Ohio

[73] Assignee: Henry Filters, Inc., Bowling Green, Ohio

[21] Appl. No.: 09/164,687

[22] Filed: Oct. 1, 1998

[51] Int. Cl.[6] .................................................. B01D 36/04
[52] U.S. Cl. ........................ 210/295; 210/168; 210/526; 210/541; 475/178; 475/179; 74/425
[58] Field of Search ..................................... 210/295, 168, 210/541, 526; 475/178, 179; 74/425

[56] References Cited

U.S. PATENT DOCUMENTS

| | | |
|---|---|---|
| 1,910,777 | 5/1933 | Soddy . |
| 2,170,951 | 8/1939 | Perry . |
| 4,396,505 | 8/1983 | Willson . |
| 4,396,506 | 8/1983 | Damerau . |
| 4,715,964 | 12/1987 | Harms . |
| 4,761,226 | 8/1988 | Creps . |
| 5,118,420 | 6/1992 | Galletti . |
| 5,167,590 | 12/1992 | Kratochvil . |
| 5,352,163 | 10/1994 | Minegishi . |
| 5,484,345 | 1/1996 | Fukaya . |
| 5,536,218 | 7/1996 | Fukaya . |
| 5,601,729 | 2/1997 | Bratten . |

*Primary Examiner*—Thomas M. Lithgow
*Attorney, Agent, or Firm*—Howard & Howard

[57] ABSTRACT

A drive system for a filtration apparatus includes a housing, a motor, an input gear driven by the motor, a ring gear, an eccentric gear assembly, an internal gear assembly, and an output gear. The ring gear is driven by the input gear about a central axis. The eccentric gear assembly includes an eccentric plate rotatable about the central axis, concentric rollers, and eccentric rollers. The eccentric plate is fastened to the ring gear to rotate therewith. The concentric rollers are interposed between the eccentric plate and the housing to enable rotation therebetween. The eccentric plate is eccentrically movable about the central axis within a bore of the housing. The internal gear assembly has an eccentric plate rotatable about the central axis and circular bores extending through the eccentric plate. The eccentric rollers of the eccentric gear assembly are interposed between the eccentric gear assembly and the internal gear assembly such that rotation of the eccentric gear assembly causes the internal gear assembly to also rotate. The eccentric plate has lobes. The drive system also includes a stationary pin and roller sleeve pair operable with a respective circular bore of the eccentric plate of the internal gear assembly to enable eccentric movement of the internal gear assembly about the central axis.

2 Claims, 3 Drawing Sheets

SHAFT MOUNTED GEAR BOX

TECHNICAL FIELD

The present invention relates to drive systems employing speed gear reduction.

BACKGROUND OF THE INVENTION

Drive systems for mechanical apparatus often utilize engines or motors in conjunction with gear boxes. The gear boxes include housings, shafts, and gears in combinations which can be quite large and expansive. For example, gear boxes may include multiple gear sets to effect several stage gear reductions or increases in rotating output of shafts. The gears may rotate about a number of orthogonal axes. Motors coupled to the gear boxes further increase the overall size of the drive systems.

Conventional drive systems of gear boxes and motors may present space constraint problems in certain applications. One instance is drive systems for machine tool coolant filtration tanks. These filtration tanks employ conveyor systems to drag out particulate from the bottom of settlement compartments of the filtration tanks. The conveyor systems include a drive shaft and have spaced apart drive sprockets which serve to drive chains and flights of the conveyor system. The flights extend laterally across the width of the tank and carry debris from the tank when the drive shaft is rotated.

Located laterally outside the filtration tanks are drive systems. One common system includes an electric motor having a laterally extending shaft with a pulley thereon connecting with a second pulley coupled to a gear box which drives the chain and flight conveyor. The motor, shafts, pulleys, gearbox, and a safety cover or housing mounted on the side of the settlement tank can be of substantial width.

Filtration tanks may be located below floor level in pits to accommodate the settlement tanks and the drive systems mounted on the sides thereof. It is desirable to limit the size of the pits. The ability to do this is related to minimizing the width of the gear box and motor of the drive system.

Alternatively, a filtration tank may be located above ground and adjacent a wall. Again, to conserve space it is desirable to provide a gear box and motor on the side of the filtration tank which is as narrow in width as possible. This allows the filtration tank to be placed close to the wall.

Another common is that drive systems can be complex and expensive. Often the gear boxes have a large number of gears, pulleys, and shafts which are quite costly. Further, compact gear reduction systems usually do not provide a high gear reduction ratio.

The present invention addresses these short-comings of drive systems utilizing oversized gearboxes which are unnecessarily complex and expensive and which do not provide a high gear reduction ratio.

SUMMARY OF THE INVENTION

It is an object of the present invention to provide a gear box and motor combination which is more compact in width than those employed in conventional drive systems.

In carrying out the above object and other objects, the present invention provides a drive system including a housing, a motor supported relative to the housing, an input gear driven by the motor, and a ring gear. The ring gear is rotatable about a central axis and has a generally circular periphery driven by the input gear to provide a first gear reduction.

The drive system further includes an eccentric gear assembly. The eccentric gear assembly has an eccentric plate rotatable about the central axis, concentric rollers, and eccentric rollers. The eccentric plate is fastened to the ring gear to rotate therewith. The concentric rollers are interposed between an outer radial surface of the eccentric plate and the housing to enable rotation therebetween. The eccentric plate is eccentrically movable about the central axis within a bore of the housing.

The drive system also includes an internal gear assembly. The internal gear assembly has an eccentric plate rotatable about the central axis and circular bores extending through the eccentric plate. The eccentric rollers of the eccentric gear assembly are interposed between an inner radial surface of the eccentric plate of the eccentric gear assembly and an outer radial surface of the eccentric plate of the internal gear assembly such that rotation of the eccentric gear assembly causes the internal gear assembly to also rotate. The eccentric plate has an inner radial surface with lobes.

The drive system also includes a stationary pin and roller sleeve pair operable with a respective circular bore of the eccentric plate of the internal gear assembly to enable eccentric movement of the internal gear assembly about the central axis.

The drive system further includes an output gear rotatable about the central axis and supported relative to the housing. The output gear has an outer radial surface with lobes. The lobes of the output gear and the eccentric plate of the eccentric gear assembly are engageable to cause the output gear to rotate to drive a shaft as the eccentric plate of the eccentric gear assembly rotates.

These and other features, aspects, and embodiments of the present invention will become better understood with regard to the following description, appended claims, and accompanying drawings.

BEST MODE FOR CARRYING OUT THE INVENTION

Figure 1:
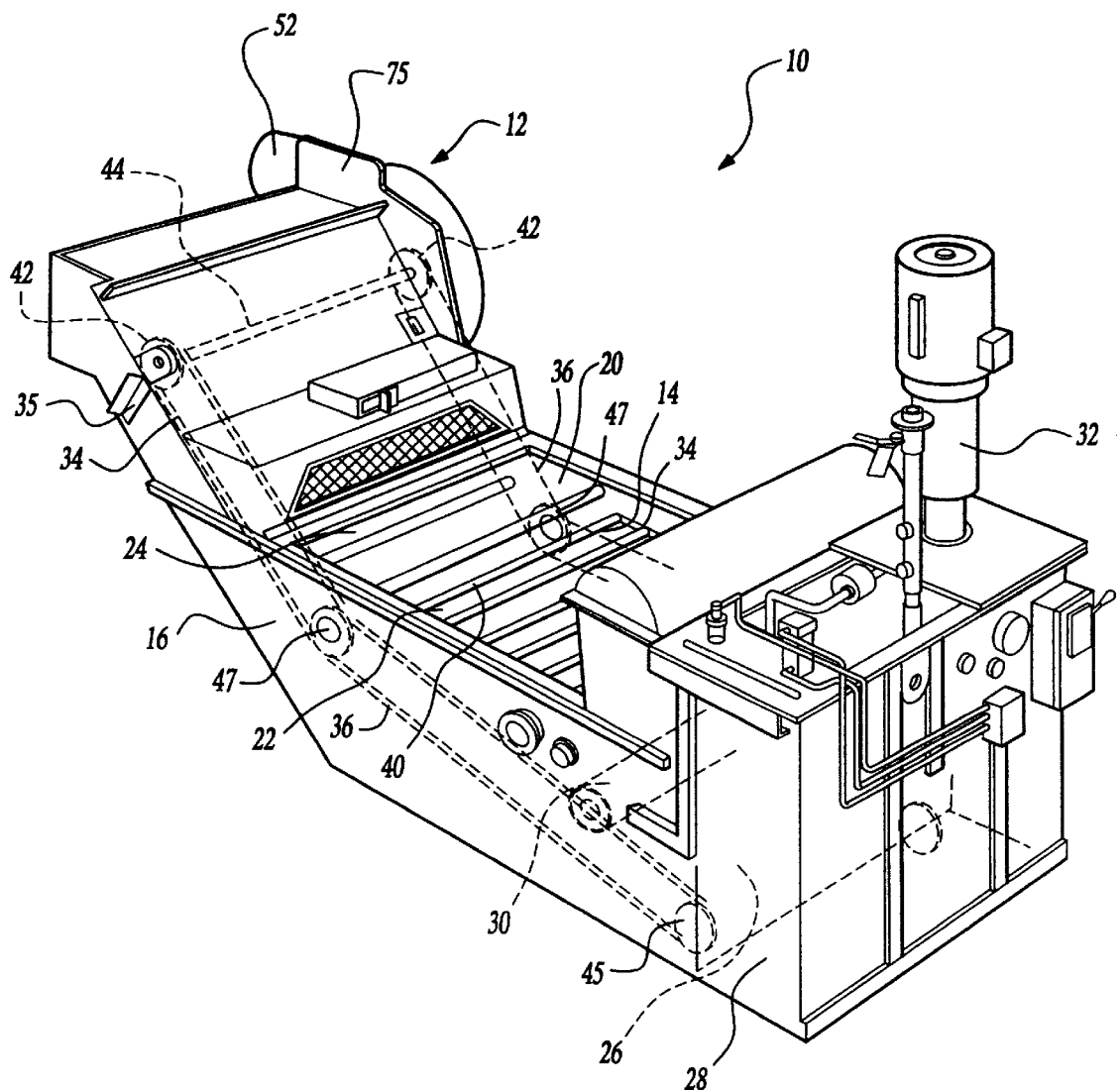
FIG. 1 is a perspective view of a machine tool coolant filtration tank utilizing a drive system having a gear box and motor made in accordance with the present invention.

A machine tool coolant filtration tank 10 is shown in FIG. 1 which employs a compact drive system 12 made in accordance with the present invention. Machine tool coolant is used to lubricate and cool machine tools (not shown) during machining. Also, the tool coolant serves to carry away machining debris and metal chips from the machine tools. Filtration tank 10 is used to remove these chips and debris from the tool coolant with the cleansed tool coolant being returned to the machine tool for further use.

The contaminated tool coolant is often transferred through trough systems (not shown) and is collected in filtration tank 10. Filtration tank 10 may be located in a pit below floor level to accommodate the draining of contaminated tool coolant from the machine tools into filtration tank 10. It is desirable to keep the size of filtration tank 10 and the underground pit as small as possible. Alternatively, if filtration tank 10 is located above ground, but next to a wall, it is also desirable to keep drive system 12 as narrow in lateral width as possible.

Tool coolant is collected in a settlement compartment 14 of filtration tank 10. Settlement compartment 14 includes a pair of laterally spaced apart side walls 16 and 20, a floor 22, an inclined rear wall 24, and a forward wall 26. Located ahead of forward wall 26 is a clean tool coolant compartment 28 for storing filtered tool coolant.

A portion of the contaminants which enter settlement tank 14 fall out of suspension and onto floor 22. The remaining contaminants are removed from the tool coolant using a filtration mechanism 30, such as a drum filter or else a series of disc filters. Tool coolant passes through screens on the filters with a filter cake of contaminants forming on the surface of the screens. Filtration mechanism 30 is rotated or indexed with a scraper (not shown) scraping the filter cake off the screens. The filter cake then falls atop floor 22.

A pump 32 is fluidly connected (not shown) to the filtration mechanism 30 to provide suction to effect the passage of tool coolant through the screens and to pump cleansed tool coolant back to clean tool coolant compartment 28 and then to the machine tools for reuse. U.S. Pat. No. 4,715,964, which is hereby incorporated by reference, discloses in fuller detail the filtration operation and compartments of filtration tank 10.

A conveyor system 34 is used to drag out particulate which has fallen on to floor 22, up inclined rear wall 24, and out a rear opening 35. Conveyor system 34 includes a pair of laterally spaced apart chains 36 and laterally extending flights 40 extending therebetween. Laterally spaced drive sprockets 42 are mounted on a shaft 44 disposed adjacent the top end of inclined wall 24. A pair of idle sprockets 45 is used. at the forward end of settlement compartment 14 to rotatably support chains 36 at the forward end of settlement compartment 14. Similarly, intermediate idler sprockets 47 are used at the transition between floor 22 and inclined rear wall 24. When shaft 44 and drive sprockets 42 are rotated, flights 40 travel across floor 22 and up inclined rear wall 24 dragging contaminants out of settlement compartment 14 and dumping them from rear opening 35. Typically, though not shown, a waste bin catches the discarded contaminants so that the contaminants may be recycled.

Figure 2:
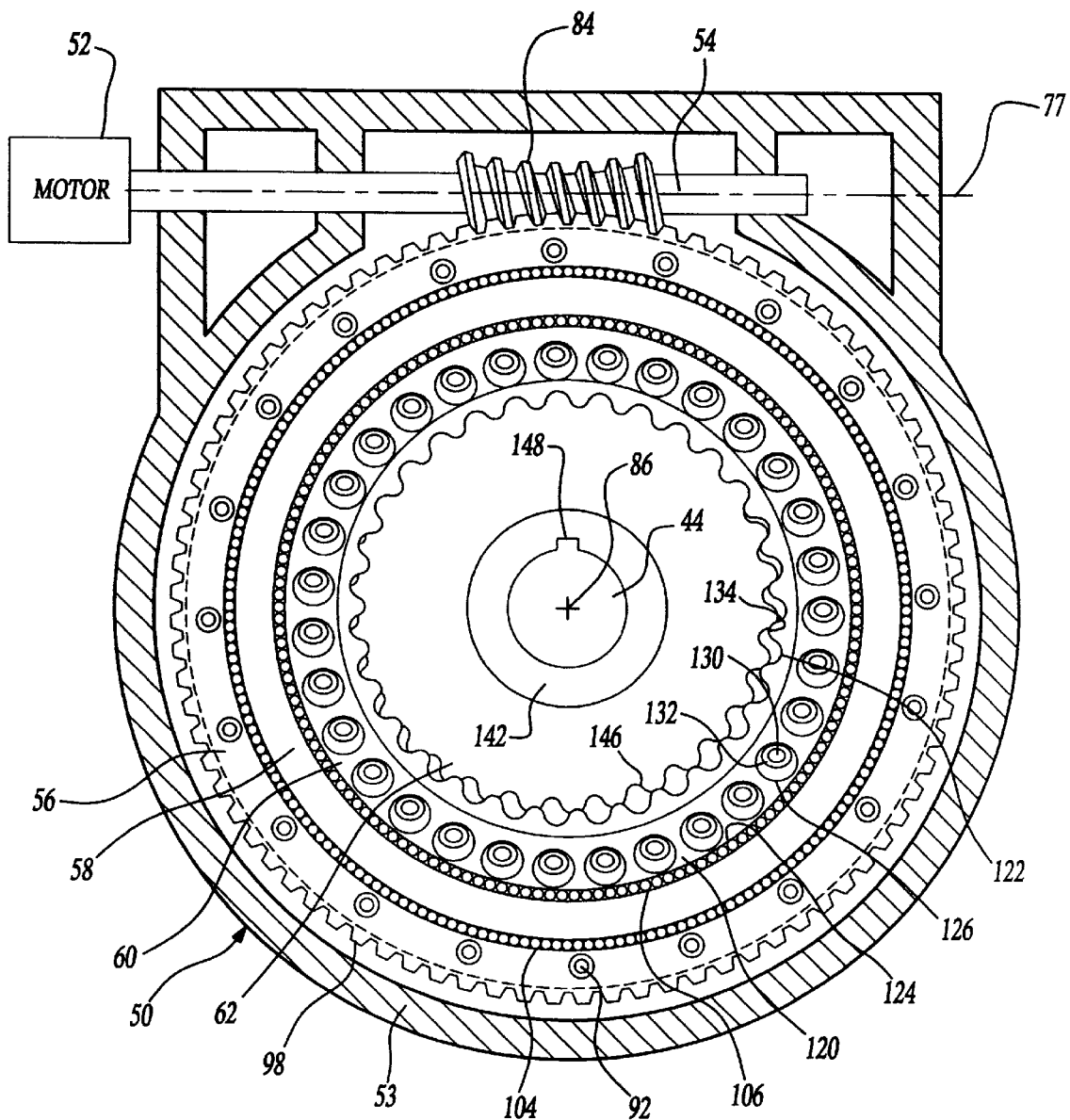
FIG. 2 is a schematic side view, partially in cutaway, of the gear box of FIG. 1.

Drive system 12 is used to drive shaft 44. Major components of drive system 12 are shown schematically in FIGS. 2 and 3. These components include a gear box 50 and a motor 52. Gear box 50 includes a housing 53, a worm screw 54, a ring gear assembly 56, an eccentric plate assembly 58, an eccentric internal lobed gear assembly 60, an eccentric output lobed gear assembly 62. These components cooperate to form a compact gear reduction set as will be described below.

Figure 3:
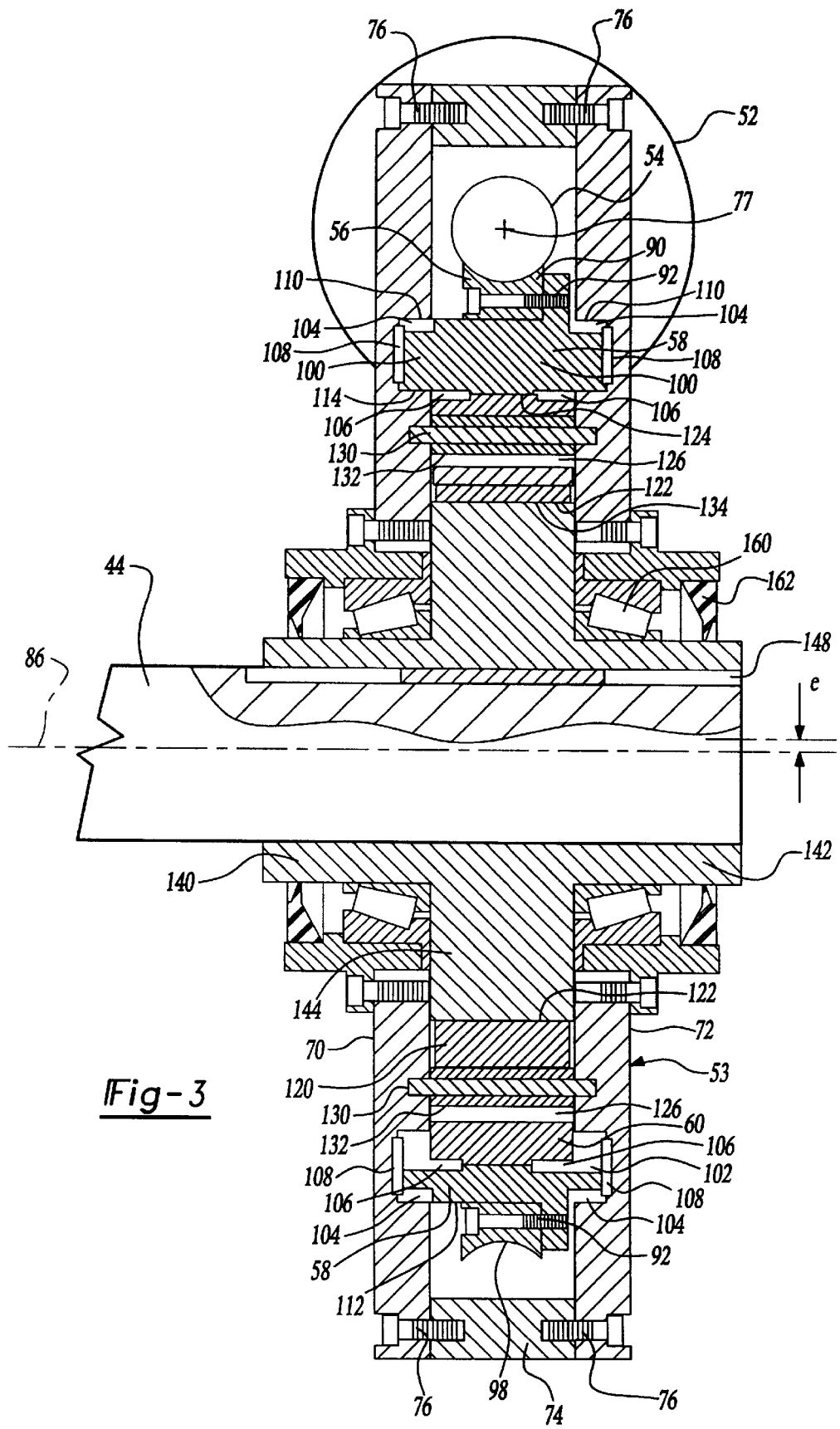
FIG. 3 is a schematic sectional view of the gear box and motor taken along line 3—3 of FIG. 2.

Referring to FIG. 3, housing 53 includes side plates 70 and 72 and an intermediate peripheral wall 74 extending therebetween forming generally closed housing 53. Inboard side plate 70 is preferably secured to side wall 20 of settlement compartment 14. The total width of housing 53 is less than six inches. Plates 70 and 72 are fastened to peripheral wall 74 with fasteners 76.

Motor 52, in this exemplary embodiment, is a ¾ horsepower electric motor which operates at 1725 revolutions per minute. A bracket 75 (FIG. 1) secured to settlement compartment 14 supports motor 52. Motor is coupled to and drives worm screw 54 which rotates about a longitudinal axis 77. Worm screw 54, in this example, has a single thread worm with six threads or teeth 84 per inch and has a two inch pitch diameter. Worm screw 54 serves as an input gear. It is contemplated that other types of input gears could also be used to drive the periphery of ring gear assembly 56.

Located beneath motor 52 and worm screw 54 is ring gear assembly 56. Ring gear assembly 56 is driven by worm screw 54 and rotates about a central axis 86 which extends perpendicular to longitudinal axis 76. Disposed radially within ring gear assembly 56, which is generally C-shaped in cross-section, are plate assembly 58, internal gear assembly 60, and output gear assembly 62 providing a compact packaging of drive system 12.

Ring gear assembly 56 includes a worm gear 90. Worm gear 90 has six teeth 98 per inch with a pitch diameter of 15 inches for a total of ninety teeth 98. This first gear set of worm screw 54 and worm gear 90 thus have a gear reduction ratio of 90:1.

Worm gear 90 is fastened to eccentric plate assembly 58 by fasteners 92 such that rotation of worm gear causes rotation of the eccentric plate assembly about central axis 86. Eccentric plate assembly 58 includes an eccentric plate 100, a bore 102, a plurality of concentric rollers 104, a plurality of eccentric rollers 106, and a pair of thrust plates 108. Thrust plates 108 are secured to respective side plates 70 and 72. Bore 102 extends partially into side plates 70 and 72. Eccentric plate 100 is radially eccentrically movable within bore 102 to be eccentric about central axis 86 as the eccentric plate 100 is driven by worm gear 90.

Concentric rollers 104 are interposed between horizontally extending portions 110 of side plates 70 and 72 and an outer radial surface 112 of eccentric plate 100. Concentric rollers 104 roll against horizontally extending portions 110 of side plates 70 and 72 to allow eccentric plate 100 to rotate about central axis 86. Eccentric rollers 106 are interposed between an inner radial surface 114 of eccentric plate 100 and internal gear assembly 60.

Internal gear assembly 60 includes an eccentric plate 120. Eccentric plate 120 has an inner radial surface 122, an outer radial surface 124, and contains a plurality of circular bores 126. Circular bores 126 extend between side plates 70 and 72 of housing 53.

Torque between eccentric plate assembly 58 and internal gear assembly 60 is transmitted through eccentric rollers 106. Thus, as eccentric plate 100 of assembly 58 rotates about central axis 86, the eccentric plate 100 drives eccentric plate 102 of internal gear assembly 60 to also rotate.

Internal gear assembly 60 further includes a plurality of pins 130 and roller sleeves 132 pairs. Each pin 130 is secured at each end to respective side plates 70 and 72 to remain stationary with respect to housing 53. Each roller sleeve 132 extends about a respective pin 130. Each pin 130 and roller sleeve 132 pair cooperates with a respective circular bore 126 of eccentric plate 120 to allow the eccentric plate 120 to eccentrically move radially inward and outward with respect to pins 130 as it rotates about central axis 86.

Inner surface 122 of eccentric plate 120 includes a plurality of lobes 134. Lobes 134 cooperate with output gear assembly 62 to drive the output gear assembly. Preferably, eccentric plate 120 has thirty one lobes 134.

Specifically, output gear assembly 62 includes an output gear 140 having an axial portion 142 and a flange portion 144. Flange portion 144 includes a plurality of lobes 146 which engage lobes 134 of eccentric plate 120. The total number of lobes 146 is different than the total number of lobes 134. Preferably, there are thirty lobes 146. Thus, in a preferred embodiment, there is one more lobe 134 than lobes 146.

Lobes 134 and 146 engage each other such that rotation of internal gear assembly 60 causes output gear assembly 62 to rotate about central axis 86. As there are only thirty lobes 146 on output gear 140, eccentric plate 120 may "orbit" about the thirty lobes 146 of flange portion 144.

Axial portion 142 has a key way 148 located on its inner radial surface. Shaft 44 has a key way machined therein. A key 154 in the key ways to fasten shaft 44 to output gear 140. Thus, shaft 44 rotates about central axis 86 as output gear 140 rotates.

A number of seals and bearing members are located between the above components. Bearings 160 are interposed between axial portion 142 of output gear 140 and side plates 70 and 72 of housing 53 to enable rotation of the output gear with respect to the stationary housing. Seals 162 seal bearings 160.

In operation, motor 52 operates at 1725 revolutions per minute to drive worm screw 54 about longitudinal axis 77 at a like speed. Worm screw 54 drives worm gear 90 with a gear reduction of 90:1. Consequently, worm gear 90 rotates about central axis 86 at 19.167 revolutions per minute. Worm gear 90 is connected to eccentric plate 100 of eccentric plate assembly 58 to cause the eccentric plate 100 to rotate therewith.

Eccentric plate 100 bears upon eccentric plate 120 of internal gear assembly 60 via eccentric rollers 106 causing the eccentric plate 120 to rotate therewith. During rotation, eccentric plate 100 moves radially inwardly and outwardly with respect to bores 102. Eccentric rollers 106 allow eccentric plate assembly 58 to eccentrically roll.

The rotary movement of internal gear assembly 60 is transferred to output gear 140 and shaft 44 through the engagement between lobes 134 and 146. Internal gear assembly 60 eccentrically rolls or orbits about output gear 140 and not concentrically about central axis 86. Circular bores 126, stationary pins 130, and roller sleeves 132 allow internal gear assembly 60 to eccentrically roll. gear 140 drives shaft 44 of conveyor system 34. Consequently, conveyor system 34 transports particulate out of tool coolant filtration tank 10.

Thus it is apparent that there has been provided, in accordance with the present invention, a drive system for a filtration tank apparatus that fully satisfies the objects, aims, and advantages set forth above. While the present invention has been described in conjunction with specific embodiments thereof, it is evident that many alternatives, modifications, and variations will be apparent to those with ordinary skill in the art in light of the foregoing description. Accordingly, it is intended to embrace all such alternatives, modifications, and variations as fall within the spirit and broad scope of the appended claims.

What is claimed is:

1. A drive system comprising:

a housing;

a motor supported relative to the housing;

an input gear driven by the motor;

a ring gear rotatable about a central axis and having a generally circular periphery driven by the input gear to provide a first gear reduction;

an eccentric gear assembly having an eccentric plate rotatable about the central axis, a plurality of concentric rollers, and a plurality of eccentric rollers, the eccentric plate fastened to the ring gear to rotate therewith, the concentric rollers interposed between an outer radial surface of the eccentric plate and the housing to enable rotation therebetween, wherein the eccentric plate is eccentrically movable about the central axis within a bore of the housing;

an internal gear assembly having an eccentric plate rotatable about the central axis, a plurality of circular bores extending through the eccentric plate, wherein the eccentric rollers of the eccentric gear assembly are interposed between an inner radial surface of the eccentric plate of the eccentric gear assembly and an outer radial surface of the eccentric plate of the internal gear assembly such that rotation of the eccentric gear assembly causes the internal gear assembly to also rotate, the eccentric plate having an inner radial surface with a plurality of lobes;

a stationary pin and roller sleeve pair operable with a respective circular bore of the eccentric plate of the internal gear assembly to enable eccentric movement of the internal gear assembly about the central axis; and an output gear rotatable about the central axis and supported relative to the housing, the output gear having an outer radial surface with a plurality of lobes, wherein the plurality of lobes of the output gear and the eccentric plate of the eccentric gear assembly are engageable to cause the output gear to rotate to drive a shaft as the eccentric plate of the eccentric gear assembly rotates.

2. The drive system of claim 1 further comprising:

a filtration tank apparatus for removing contaminants from a fluid and conveying settled contaminants therefrom, the filtration tank apparatus including:

a settlement tank including a floor, a pair of side walls, and an inclined wall;

a conveyor system including a pair of laterally spaced apart endless chains and a plurality of flights extending laterally between the endless chains, the conveyor system traversing the floor and inclined wall to carry contaminants from the settlement tank; and a shaft coupled to the output gear to be driven by the output gear about the central axis for driving the conveyor system.

\* \* \* \* \*